(12) United States Patent
Kirk et al.

(10) Patent No.: US 6,475,316 B1
(45) Date of Patent: Nov. 5, 2002

(54) METHODS OF ENHANCING ADHESION

(75) Inventors: Seth M. Kirk, Minneapolis, MN (US); Stephen F. Wolf, St. Paul, MN (US); Joseph M. McGrath, Lake Elmo, MN (US); Albert I. Everaerts, Oakdale, MN (US); Peter A. Stark, Cottage Grove, MN (US); Terrence W. Miller, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 140 days.

(21) Appl. No.: 09/612,015

(22) Filed: Jul. 7, 2000

(51) Int. Cl.[7] ............................ B32B 31/12; B32B 31/26
(52) U.S. Cl. ...................... 156/82; 156/283; 156/309.6; 156/309.9; 156/326
(58) Field of Search ..................... 156/82, 283, 309.6, 156/309.9, 325, 326

(56) References Cited

U.S. PATENT DOCUMENTS

| | | | |
|---|---|---|---|
| 2,697,058 A | 12/1954 | Lasak | |
| 3,393,615 A | 7/1968 | Micheln | 94/39 |
| 3,435,003 A | 3/1969 | Craven | 260/47 |
| 3,664,242 A | 5/1972 | Harrington et al. | 94/22 |
| 3,752,946 A * | 8/1973 | Bailey et al. | 200/267 |
| 3,844,669 A | 10/1974 | Eigenmann | 404/94 |
| 3,849,351 A | 11/1974 | Jorgenson | 260/18 |
| 3,909,497 A | 9/1975 | Hendry et al. | 260/77.5 |
| 3,914,468 A | 10/1975 | Condon et al. | 427/137 |
| 3,962,486 A * | 6/1976 | Gerek et al. | 219/121.36 |
| 4,058,641 A | 11/1977 | Hnojewyj | 427/137 |
| 4,490,432 A | 12/1984 | Jordan | 428/220 |
| 4,617,354 A | 10/1986 | Augustin et al. | 525/301 |
| 5,094,902 A | 3/1992 | Haenggi et al. | 428/150 |
| 5,211,990 A | 5/1993 | McKinney et al. | 427/447 |
| 5,362,801 A | 11/1994 | Amici et al. | 525/57 |
| 5,391,015 A | 2/1995 | Kaczmarczik et al. | 404/14 |
| 5,536,786 A | 7/1996 | Callahan, Jr. et al. | 525/221 |
| 5,625,006 A | 4/1997 | Callahan, Jr. et al. | 525/301 |
| 5,641,856 A | 6/1997 | Meurs | 528/310 |
| 5,652,021 A | 7/1997 | Hunt et al. | 427/248.1 |
| 5,688,449 A | 11/1997 | Fox | 264/54 |
| 5,827,913 A | 10/1998 | Baetzold et al. | 523/210 |
| 5,900,282 A | 5/1999 | Collins et al. | 427/447 |
| 6,043,320 A * | 3/2000 | Megill | 525/332.6 |

FOREIGN PATENT DOCUMENTS

| | | |
|---|---|---|
| CA | 2113407 | 3/1995 |
| DE | 3640906 | 6/1988 |
| DE | 3900861 | 7/1990 |
| DE | 3926897 | 3/1991 |
| DE | 4444752 | 6/1996 |
| EP | 0339742 | 11/1989 |
| JP | 05200351 | 8/1993 |
| WO | WO 97/00294 | 1/1997 |
| WO | WO 97/21777 | 6/1997 |
| WO | WO 97/35937 | 10/1997 |
| WO | WO 98/08614 | 3/1998 |
| WO | WO 98/33860 | 8/1998 |
| WO | WO 99/03642 | 1/1999 |
| WO | WO 00/09811 | 2/2000 |
| WO | WO 00/24970 | 5/2000 |

OTHER PUBLICATIONS

K. A. Gross, et al, *Journal of Thermal Spray Technology*, 8, 583–589 (1999).

L. Pawlowski, *The Science and Engineering of Thermal Spray Coatings*, ( John Wiley & Sons, New York: 1995).

* cited by examiner

Primary Examiner—Sam Chuan Yao
(74) Attorney, Agent, or Firm—Carolyn A. Fischer

(57) ABSTRACT

Methods for enhancing adhesion between at least two surfaces, preferably of at least two different materials, using a powdered surface preparation composition.

12 Claims, 2 Drawing Sheets

METHODS OF ENHANCING ADHESION

BACKGROUND

Adhesives have been widely used to bond materials together, particularly to hold a variety of different materials together. There are typically two requisites for adhesives in order for them to function properly. First, an adhesive should form a strong bond to each of the materials to be joined together. Also, the adhesive should have sufficient cohesive strength so it does not come apart internally when performing its desired function of holding the two materials together. Occasionally, when bonding two different materials together it is difficult to find one adhesive material that satisfactorily adheres to each of the different materials and at the same time has sufficient cohesive strength to perform its desired function.

There are several approaches available to providing bonding between two different substrates. Usually an adhesive material with good cohesive properties can be found that strongly adheres to the first material. Subsequently, adhesion to the second material can be enhanced by using a surface treatment technique. Various types of surface treatments are available for increasing bonding properties of substrates. Typical surface treatments for enhancing adhesion include: mechanical abrasion; corona discharge; flame treatment; plasma treatment; UV radiation; chemical oxidation with the use of oxidizing agents; and the introduction of functional groups by surface chemical grafting. These treatments all modify the surface of the treated material by lowering its surface energy so as to improve its wetting characteristics. Although some of these treatment methods work well to enhance bonding of an adhesive to a substantially flat surface they are much less effective for bonding an adhesive to a rough or porous surface. Rough or porous materials have higher total surface area than flat materials, and, as a result, most of the surface is not directly available for bonding to a pressure-sensitive adhesive.

Alternatively, it is known to apply chemical surface preparation compositions (e.g., primers) to materials in order to enhance bonding properties between two materials. It is common when painting a higher energy surface, such as bare wood or clean metal, to apply a surface preparation composition in order to enhance the adhesion or wetting of the surface prior to application of the final paint layer. Similarly when applying reflective pavement marking tapes to roadway surfaces it is well known to use a chemical surface preparation composition on the roadway prior to applying a reflective pavement marking tape having a pressure-sensitive adhesive thereon.

Such chemical surface preparation compositions can be organic solvent based or water based. Typically, it is necessary to apply a surface preparation composition to a substrate, allow the solvent or water to evaporate, and then apply the adhesive-containing surface to be bonded to the substrate. The time it takes to allow for drying of the solvent or the water in a surface preparation composition can be very detrimental to the application of roadway markings where a lane or two of traffic needs to be closed for the duration of the tape application. In addition, where organic solvent-based surface preparation compositions are used, the evaporation of the organic solvent is detrimental to the environment and may exceed VOC (volatile organic content) emission standards.

Thus, there is a need for other methods of enhancing adhesion between materials, particularly two different materials.

SUMMARY OF THE INVENTION

The present invention provides methods for enhancing adhesion between at least two surfaces, preferably of at least two different materials, using a powdered surface preparation composition. Preferably, at least one of the surfaces includes a material selected from the group of metal, asphalt, concrete, ceramic, wood, masonry, glass, polymeric materials, and combinations thereof. At least one of the surfaces can optionally be a painted surface. Such a material can form a surface on which a reflective traffic control sheeting or device might be attached, such as a roadway, a bridge abutment, a traffic barricade, or a barrier. The reflective traffic control sheeting or device is typically a polymeric sheeting such as a pavement marking, a sign sheeting, or a barrier delineation sheeting.

The powdered surface preparation composition can include a powdered thermoplastic or thermoset polymer. It is preferably a crosslinked adhesive. Preferably, the crosslinked adhesive includes: at least one polymer; and at least one degradable crosslinker incorporated into the polymer. Preferably, the degradable crosslinker includes: at least one energetically labile moiety; and at least two free radically polymerizable groups, wherein the degradable crosslinker is capable of fragmentation into at least two fragments upon activation by an external energy source and wherein at least two fragments are essentially free of free radicals and ethylenic unsaturation.

The thermal spraying preferably includes flame spraying, and more preferably, reactive thermal spraying. Preferably, the powdered surface preparation composition includes a crosslinked adhesive that is at least partially decrosslinked during thermal spraying. This is an example of reactive thermal spraying.

In one embodiment, a method of enhancing adhesion between at least two surfaces includes: thermal spraying a powdered surface preparation composition onto at least a portion of a first surface; and subsequently contacting at least a portion of a second surface of a nonpowdered material with a portion of the first surface having the powdered surface preparation composition thereon.

In another embodiment, a method of enhancing adhesion between at least two surfaces includes applying a powdered surface preparation composition onto at least a portion of at least one surface, wherein the powdered composition comprises a crosslinked adhesive, and at least partially thermally decrosslinking the crosslinked adhesive composition. The powdered surface preparation composition is preferably applied by thermal spraying. Preferably, the crosslinked adhesive is at least partially thermally decrosslinked substantially simultaneously with applying the powdered composition.

In yet another embodiment, a method of enhancing adhesion between at least two surfaces includes: thermal spraying a powdered surface preparation composition onto at least a portion of at least one surface; and contacting a second surface with the surface having the powdered surface preparation composition thereon; wherein at least one surface comprises a scrim. In this way, three materials can be held together using the powdered surface preparation composition of the present invention—a scrim, which is applied to a substrate, and a second material attached thereto.

Other embodiments are described in greater detail below.

DETAILED DESCRIPTION OF PREFERRED EMBODIMENTS

The present invention provides methods for enhancing adhesion between at least two surfaces, preferably, surfaces of at least two different materials. A preferred method involves thermal spraying a powdered surface preparation composition onto at least a portion of at least one surface of a material and subsequently contacting a second nonpowdered material with the surface having the powdered surface preparation composition thereon, thereby forming a bond between the contacting surfaces. The second material is preferably different from the first material.

Figure 1:
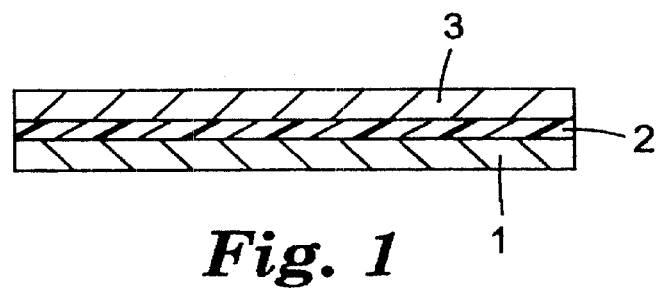
FIG. 1 shows an illustration of two materials that have been adhered together by application of a thermal technique according to the present invention.

FIG. 1 shows an illustration of a substrate (first material) 1 that has been adhered to a second material 3 by application of a layer of a thermal spray surface preparation composition 2.

Thermal Spraying Process

The purpose of this invention is to provide a method of enhancing adhesion between at least two materials. This is preferably accomplished by thermal spraying the powdered surface preparation composition onto a first surface. A thermal spray process is a process where the deposition of a largely molten material is enabled with a highly directional gas stream. Thermal spray processes include molten metal spraying, electric arc spraying, plasma arc spraying, flame spraying, high-velocity oxygen fuel spraying, and detonation gun spraying. A good description of these processes is found in L. Pawlowski, *The Science and Engineering of Thermal Spray Coatings*, (John Wiley & Sons, New York: 1995). These thermal spray processes differ primarily in the methods in which the thermal energy and the kinetic energy are transferred to the deposited material.

Thermal spray processes deliver molten material in particles or droplets that are typically 10–500 microns in diameter. Because of this droplet nature of the depositing material, the coatings developed from these processes possess a lamellar structure, and typically have high surface roughness. Thermal sprayed coatings typically contain voids and unmelted: or incompletely melted particles. Particle boundaries, variation in crystalline structure, and voids in thermal spray coatings are typical and give the coatings superior resistance to thermal stress. However, because thermal sprayed coatings usually decrease in temperature after being deposited, they typically contain compressive stress. Despite these general characteristics, the precise character of a deposited coating is strongly determined by variables in the depositing material and the coating process.

The effectiveness of thermal and kinetic energy transfer to the material being deposited (i.e., the depositing material or the surface preparation composition in a given thermal spray system) depends upon the composition and structure, of the material. To develop a successful thermal sprayed coating, the depositing material must gain enough thermal energy to melt, but not so much that it vaporizes. Depositing material must also gain enough kinetic energy to flatten and spread out on the surface after striking the surface. It is this ability to spread out on the surface which makes thermal spraying advantageous for coating rough surfaces. Thermal spraying can produce high surface contact of deposited material with the receiving surface.

The preferred thermal spray methods of this invention are flame spraying and reactive flame spraying. Most preferred is reactive flame spraying wherein the powder undergoes a nonreversible chemical reaction. Flame spraying involves the introduction of a material to be deposited into a flame that is typically generated external to the gas introduction apparatus. The kinetic energy of the feed gases typically transports the molten material; however, an additional transport gas stream may be utilized. Although flame spray deposition methods can produce high thermal loads on the coated substrates, the overall thermal transfer to the depositing material is relatively low in comparison to other, thermal spray techniques. The thermal energy of a flame spray system is determined by the flow rates and composition of fuel and oxidizer gases that are used. Flame spray systems typically create flames from acetylene and oxygen because this produces a relatively hot flame. Lower temperature systems for the deposition of more thermally sensitive materials are often demonstrated with propane/air flames.

Commercial flame spray systems are available that use either particle or wire feeds, and other systems have been described that utilize liquid feeds (K. A. Gross, et al, *Journal of Thermal Spray Technology*, 8, 583–589 (1999). All material introduction methods typically have the same ultimate goal; to produce small, potentially liquified particles that collide with the receiving surface. Each method produces these small coating particles differently, but each method will produce a distribution of particle sizes. Accordingly, in flame spray deposition systems, smaller particles may volatize or burn and larger particles may experience reduced melting. Depositing material typically reaches only a fraction of the flame temperature during the flame residence time. Control of this residence time is a key process variable in flame spray deposition. The precise residence time needed for a given system will be determined by the characteristics of the flame spray system and the depositing material. This residence time can be modified, for example, by changing the flow rate of a designated power transport gas stream or by changing the precise point of introduction of the depositing material into the flame. A depositing material may also be modified by further exposure to the flame. A surface to be coated may also be heated by a flame or other thermal source prior to deposition to allow the depositing material to remain in a softened or fluid state for a longer time on the receiving surface.

Material to be deposited in powder form is typically introduced to a depositing flame in a pressurized gas stream. This carrier gas stream is typically either the oxidizer for the flame or a designated carrier gas stream. Powders can be gravity fed or mechanically fed into the gas stream or powders can be drawn off a contained fluidized bed by the venturi effect of a carrier gas stream. Several flame deposition systems have been reported that describe the spraying of a liquid in or near a flame to achieve deposition.

Almost all flame spray equipment that is described in journal literature, patent literature, and vendor information is gun-shaped, trigger-actuated and hand-held. U.S. Pat. No. 4,694,990 (Karlsson et al.) describes a hand-held thermal spray coating apparatus suitable for the materials in this invention. The gun is effectively a point source of sprayed material; large areas of sprayed material are developed by traversing the receiving surface with the gun. There are multiple vendors of flame spray equipment. Flame spray equipment vendors often sell powder feed systems separate from the flame gas supply and control systems. Examples of commercial flame spray equipment useful for this invention include the Model 5P-11 gun available under the tradename THERMO-SPRAY from Sulzer Metco (US) Inc. (Westbury, N.Y. 11590) and the Model 124 FLAMESPRAY SYSTEM, available from Plastic Flamecoat Systems,(Big Spring, Tex. 79720). U.S. Pat. No. 3,393,615 describes an applicator, available under the tradename GREEN LITE from 3M Co., which is useful in this invention.

A flame spray process that specifically utilizes the flame to fundamentally alter the composition of the injected material is considered reactive flame spraying. Flames generated in typical flame spray systems are viewed exclusively as sources of thermal energy to provide a phase change of the depositing material such as from a solid particle to a molten droplet. Accompanying this phase change is a change in the Theological properties of the material. Incidental oxidation of the depositing material may also occur in typical flame spray processes. Reactive flame spraying utilizes the reactive chemistry or the thermal energy of the flame to produce a fundamental alteration in the depositing material. The thermal properties and chemical composition of the flame can also be altered to produce intentional compositional modifications in the depositing material.

Several systems have been described that use liquid feedstocks for reactive flame spraying. Specifically, the process described in U.S. Pat. No. 5,652,021 describes the deposition of the high temperature superconductor $YBa_2CuO_x$ by igniting a spray of organometallic reagents dissolved in xylene. This same patent also describes the deposition of a silver coating developed by spraying a solution of silver nitrate in water through a flame. Gross et al. (*Journal of Thermal Spray Technology*, 8, 583–589 (1999)) also describe a flame spray system with a liquid feedstock. One example described in this document is the formation of a cobalt oxide (CoO) coating from a spray of cobalt nitrate dissolved in methanol. While these examples demonstrate the general concept of reactive flame spraying there has been no previous demonstration of such a process with solid-phase or powdered feedstocks.

Surface Preparation Compositions

The powdered surface preparation compositions of this invention can be any powdered polymers; that are capable of undergoing reversible or nonreversible phase changes upon thermal spraying. One class of materials that undergoes reversible phase changes upon thermal spraying are thermoplastic polymers. When heated above their melting point thermoplastic polymers melt or become molten (i.e., change from a solid to a liquid or fluid state). When these molten materials cool below their melting point they revert back to their original solid state. Examples of materials that fall into this class of polymers are polyolefins such as polyethylene, polypropylene, poly(ethylene acrylic acid) and poly (ethylene methacrylic acid), polyamides such as nylon, polyvinyl chlorides, thermoplastic polyesters, and acrylic polymers.

Polyolefins useful in surface preparation compositions of this invention are exemplified by the polyolefin powder coating, available from Plastic Flamecoat Systems, Big Springs, Tex. under the tradename of PFS HIGH FLOW POLYARMOUR. Polyamides useful in this invention are exemplified by 25587C Spray Powder Nylon Resin 7 available from F. J. Brodmann and Co, Harvey, La., under the tradename FLOMASTER. Other thermoplastic materials useful in surface preparation compositions of the present invention include acrylic powders such as S11CLFEMAA powder coating (available from Plastic Flamecoat Systems, Big Spring, Tex.), V3M64 (a powder mixture of 70 parts AB1060N EMAA/zinc ionomer, available from Du Pont, Wilmnington, Del. under the tradename ABCITE, 30 parts 5990I EAA copolymer available from The Dow Chemical Company, Midland, Mich. under the tradename PRIMACOR, and 1 part each of the stabilizers, TINUVIN 328, CHIMASORB 994LD and IRGANOX 1010 (all available from Ciba Specialty Chemicals, Tarrytown, N.Y.)), and B66/VYHH 75/25 (a mixture of 75 parts acrylic copolymer, available from Rohm and Haas, Philadelphia, Pa. under the tradename ACRYLOID B66 and 25 parts VYHH vinyl copolymer available from Union Carbide Corporation, Danbury, Conn.)). These examples are illustrative of the wide variety of powdered thermoplastic polymers useful in the invention but they should not limit the scope of the invention.

Another class of polymers useful in surface preparation compositions of this invention are thermosetting polymers. These polymers undergo a nonreversible crosslinking reaction after being exposed to thermal energy. Examples of this type of polymer are 226N Fusion Bonded Epoxy Coating and L6030 epoxy powder coating, both available from 3M Co., St. Paul, Minn. under the tradename SCOTCHCOAT.

Polymers with thermally reversible crosslinks are also known. Examples of thermally reversible crosslinked polymers are found in U.S. Pat. Nos. 3,435,003 (Craven), 4,617,354 (Augustin et al) and 5,641,856 (Meurs). Upon heating, the crosslinks in these materials dissociate or break. Upon cooling, the crosslinks reform. This sequence can be performed repeatedly. By incorporating thermally reversible crosslinks into polymers a composition can be heated to form a molten material, which can then be used to form a coating or molded to form an article. Upon cooling, the crosslinks reform restoring the original properties of the polymeric material. Such materials are also useful in the invention.

Preferred Surface Preparation Compositions

Preferred materials of the present invention are powdered polymers which have irreversibly degradable crosslinkers such as those described in Applicants' Assignees' are copending applications Ser. Nos. 09/612,016 and 09/611,589 filed on even date herewith. These materials include at least one polymer; and at least one degradable crosslinker incorporated into the polymer, wherein the degradable crosslinker includes: at least one energetically labile moiety; and at least two free radically polymerizable groups, wherein the degradable crosslinker is capable of fragmentation into at least two fragments upon activation by an external energy source and wherein at least two fragments are essentially free of free radicals and ethylenic unsaturation.

These materials are crosslinked polymeric powders that can be easily passed through a flame spray application apparatus. In the flame these polymeric powders undergo an irreversible thermal decrosslinking reaction that causes them to decrease in modulus and become fluid droplets. The fluid droplets then can impinge on a surface to cause increased adhesion to that surface. The degradable crosslinkers are further described below, with reference to certain terms understood by those in the chemical arts as referring to certain hydrocarbon groups. Such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof). Depending on the chemistry, the functional groups may also be degradable according to the present invention.

The term "aliphatic group" means a saturated or unsaturated, linear, branched, or cyclic hydrocarbon group. This term is used to encompass, alkyl, cycloalkyl, alkylene (e.g., thioalkylene and oxyalkylene), alkenylene, alkenyl, cycloalkenyl, aralkylene, aralkenylene, cycloalkylene, and cycloalkenylene groups, for example. The term "alkyl group" means a saturated, linear or branched, monovalent hydrocarbon group (e.g., a methyl, ethyl, isopropyl, t-butyl, heptyl, dodecyl, octadecyl, amyl, or 2-ethythexyl group, and the like). The term "cycloalkyl group" means a saturated, cyclic, monovalent hydrocarbon group. The term "alkylene group" means a saturated, linear or branched, divalent hydrocarbon group. Examples of particular alkylene groups are thioalkylene and oxyalkylene groups. The term "thioalkylene group" means a saturated, linear or branched, divalent hydrocarbon group with a terminal sulfur atom. The term "oxyalkylene group" means a saturated, linear or branched, divalent hydrocarbon group with a terminal oxygen atom. The term "alkenylene group" means an unsaturated, linear or branched, divalent hydrocarbon group with one or more carbon-carbon double bonds. The term "alkenyl group" means an unsaturated, linear or branched, monovalent hydrocarbon group with one or more carbon-carbon double bonds (e.g., a vinyl group). The term "cycloalkenyl group" means an unsaturated, cyclic, monovalent hydrocarbon group with one or more carbon-carbon double bonds. The term "aralkylene group" means a saturated, linear or branched, divalent hydrocarbon group containing at least one aromatic group. The term "aralkenylene group" means an unsaturated, linear or branched, divalent hydrocarbon group containing at least one aromatic group and one or more carbon-carbon double bonds. The term "cycloalkylene group" means a saturated, linear or branched, divalent hydrocarbon group containing at least one cyclic group. The term "cycloalkenylene group" means an unsaturated, linear or branched, divalent hydrocarbon group containing at least one saturated or unsaturated cyclic group and at least one carbon-carbon double bond. The term "aromatic group" means a mononuclear aromatic hydrocarbon group or polynuclear aromatic hydrocarbon group. The term includes both aryl groups and arylene groups. The term "aryl group" means a monovalent aromatic group. The term "arylene group" means a divalent aromatic group.

The degradable crosslinkers described below (oxime esters, oxime carbonates, and amide esters) can be used in a wide variety of polymers. Depending on the amounts and types of components in the crosslinked polymer compositions, the crosslinked polymer compositions can be tacky to the touch or essentially non-tacky to the touch at room temperature.

Generally, the degradable crosslinker is copolymerized with the monomer component (i.e., one or more monomers that are copolymerizable with the degradable crosslinker) used to prepare the polymers. The monomer component and degradable crosslinker are copolymerized according to any suitable method, as recognizable to those of ordinary skill in the art.

Any suitable monomer, or combination thereof, may be used. Preferably, monomers of the present invention are ethylenically unsaturated monomers, preferably monoethylenically unsaturated monomers, such that they can be copolymerized with the degradable crosslinkers. Preferably, the monomers are selected from (meth)acrylates, (meth)acrylic acids, vinyl esters, (meth)acrylamides, and combinations thereof.

Particularly preferred monomers are (meth)acrylate monomers, including monoethylenically unsaturated monomers, such as (meth)acrylate esters of non-tertiary alkyl alcohols, the alkyl groups of which comprise from about 1 to about 18 carbon atoms, preferably about 4 to about 12 carbon atoms, and mixtures thereof. Examples of suitable (meth)acrylate monomers useful in the present invention include, but are not limited to, methylacrylate, ethylacrylate, methyl methacrylate, ethyl methacrylate, n-butyl acrylate, decyl acrylate, 2-ethylhexyl acrylate, 2-ethylhexyl methacrylate, hexyl acrylate, isoamyl acrylate, isodecyl acrylate, isodecyl methacrylate, isononyl acrylate, isooctyl acrylate, lauryl acrylate, 2-methyl butyl acrylate, 4-methyl-2-pentyl acrylate, ethoxyethoxyethyl acrylate, isobornyl acrylate, isobornyl methacrylate, 4-t-butylcyclohexyl methacrylate, cyclohexyl methacrylate, phenyl acrylate, phenylmethacrylate, 2-naphthyl acrylate, 2-naphthyl methacrylate, and mixtures thereof. Particularly preferred are 2-ethylhexyl acrylate, isooctyl acrylate, lauryl acrylate, n-butyl acrylate, ethoxyethoxyethyl acrylate, and mixtures thereof.

Examples of other ethylenically unsaturated monomers include, but are not limited to, vinyl esters (e.g., vinyl acetate, vinyl pivalate, and vinyl neononanoate); vinyl amides; N-vinyl lactams (e.g., N-vinyl pyrrolidone and N-vinyl caprolactam); (meth)acrylamides (e.g., N,N-dimethyl acrylamide, N,N-dimethyl methacrylamide, N,N-diethyl acrylamide, and N,N-diethyl methacrylamide); (meth)acrylonitrile; maleic anhydride; styrene and substituted styrene derivatives (e.g., α-methyl styrene); and mixtures thereof.

Optional acidic monomers may also be used. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof.

The following polymerization techniques, which are described in Applicants' Assignees' copending applications Ser. Nos. 09/612,016 and 09/611,589 filed on even date herewith can be used for polymerizing the monomer component and degradable crosslinker. These techniques include, but are not limited to: the conventional techniques of solvent polymerization, dispersion polymerization, emulsion polymerization, suspension polymerization, solventless bulk polymerization, and radiation polymerization, including processes using ultraviolet light, electron beam, and gamma radiation. The starting materials may comprise any suitable additives, such as a polymerization initiator, especially a thermal initiator or a photoinitiator, of a type and in an amount effective to polymerize the monomers and degradable crosslinker.

When polymerized using emulsion, suspension, or dispersion polymerization, the resulting crosslinked polymer compositions are advantageously capable of being readily made into storage-stable, free-flowing polymer compositions. "Free-flowing" polymer compositions are those compositions containing a multitude of solid state particulates that do not substantially agglomerate (i.e., the particulates are capable of being moved by gravitational forces alone) at temperatures below the activation temperature of the degradable crosslinkers. Preferably, the free-flowing polymer compositions do not substantially agglomerate at the storage temperature and pressure.

The free-flowing polymer compositions are especially useful in certain feeding, blending, and delivery methods. For example, free-flowing polymer compositions facilitate feeding hot-melt coating compositions. Conventional feeding equipment, such as hopper feeders and powder conveyers, can be used with free-flowing polymer compositions of the invention. Furthermore, shipping and handling of free-flowing polymer compositions is typically less expensive and more convenient than shipping and handling associated with bulk polymer compositions. Free-flowing polymer compositions can also be easily dry-blended, without the need for solvents or melt blending.

The free-flowing polymer compositions can be prepared using any suitable method. In one embodiment, the particulates are filtered to a dryness of about 75% to about 95% solids using any suitable filtering technique, such as using a NÜTSCHE filter (commercially available from Northland Stainless, Inc.; Tomahawk, Wis.). The filtered particulates are then blended with silica (such as that commercially available from Degussa Corporation; Ridgefield Park, N.J., under the trade designation, AEROSIL R-972), using any suitable blending technique, such as using a ribbon blender. The coated particulates are then dried using any suitable technique. For example, the coated particulates can be air-dried in an oven. The coated particulates can also be air-dried in a fluid bed dryer, such as those commercially available from Glatt Air Techniques Inc.; Ramsey, N.J.

A wide variety of conventional additives can be mixed with the crosslinked polymer composition. In fact, when the crosslinked polymer composition is essentially non-tacky at room temperature, blending of additives with the crosslinked polymer composition is often easier. The components (i.e., crosslinked polymer composition and additives) are even able to be dry-blended, as opposed to the more costly and complicated melt-blending techniques.

Any suitable additive can be blended with the crosslinked polymer composition. For certain applications, expandable microspheres, glass bubbles, and chemical blowing agents may be useful additives. Those of ordinary skill in the art will recognize a wide variety of additives that may be useful when preparing crosslinked polymer compositions of the invention for specific applications.

For example, tackifiers can be added to the crosslinked polymer composition to increase the composition's tack. Plasticizers can also be added to the crosslinked polymer composition. For example, when the polymer is derived from a high proportion of relatively high glass transition temperature (Tg) monomers, addition of a plasticizer can increase the tack of the composition. If an increase in crosslink density of the composition is desired at any time after fragmentation of at least a portion of the degradable crosslinkers, crosslinking additives may be added to the composition. For example, ultraviolet (UV) crosslinkers facilitate crosslinking by exposure to ultraviolet radiation. Thermally reversible crosslinkers, such as those described in PCT Publication Number WO 99/42,536 (Minnesota Mining and Manufacturing Co.), facilitate crosslinking without requiring an external energy source, such as radiation.

Oxime Esters and Oxime Carbonates

Any suitable oxime ester or oxime carbonate can be used so long as it meets the definition of degradable crosslinkers of the invention. Most preferred are degradable crosslinkers containing at least one aldoxime ester moiety, aldoxime carbonate moiety, or mixtures thereof. Aldoxime esters and aldoxime carbonates were found to be more readily thermally degradable as compared to oxime esters and aldoxime carbonates in general.

Aldoxime esters (including, for example, aldoxime esters and aldoxime thioic esters) and aldoxime carbonates (including, for example, aldoxime carbonates, aldoxime xanthates, and aldoxime trithiocarbonates) generally disassociate into a nitrile fragment and an acid fragment and generally conform to the following structure (I):

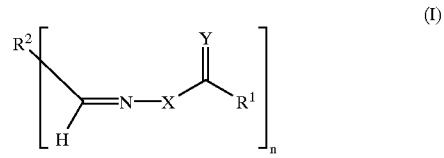

$R^1$ is a moiety that contains a free radically polymerizable group (e.g., a (meth)acrylate, (meth)acrylamide, styrene, vinyl ester, or ftmarate group). For example, $R^1$ can comprise an alkylene, thioalkylene, oxyalkylene, alkenylene, alkenyl, cycloalkenyl, aralkylene, cycloalkylene, aralkenylene, cycloalkenylene, or arylene group linked to the carbonyl group (including thiocarbonyl group) of the ester or carbonate. When $R^1$ comprises, for example, an oxyalkylene or thioalkylene group linked to the carbonyl group (including thiocarbonyl group, if Y is a sulfuir atom) through its respective terminal oxygen or sulfur atom, the degradable crosslinker is an oxime carbonate (including thiocarbonates if Y is a sulfur atom). The $R^1$ moiety may also be substituted with one or more heteroatoms (e.g., O, S, N, halogens, etc.) or functional groups (e.g., oximes, esters, carbonates, amides, ethers, urethanes, ureas, carbonyl groups, or mixtures thereof) in the hydrocarbon chain that are inert to free radical polymerization. The acid corresponding to $R^1$ (i.e., $R^1C(Y)XH$) preferably has a $pK_a$ value of greater than one for increased storage stability.

$R^2$ is a moiety that may or may not contain a free radically polymerizable group (e.g., a (meth)acrylate, (meth)acrylamide, styrene, vinyl ester, or fumarate group). Typically, $R^2$ comprises a hydrocarbon group linked to the carbon atom of the aldoxime by a carbon atom. For example, $R^2$ can comprise an alkylene, cycloalkenyl, alkenyl, alkenylene, aralkylene, aralkenylene, cycloalkylene, cycloalkenylene, or arylene group linked to the carbonyl group (including thiocarbonyl group) of the ester or carbonate. The $R^2$ moiety may also be substituted with one or more heteroatoms (e.g., O, S, N, halogens, etc.) or functional groups (e.g., oximes, esters, carbonates, amides, ethers, urethanes, ureas, carbonyl groups, or mixtures thereof) in the hydrocarbon chain that are inert to free radical polymerization. X and Y are independently selected from oxygen (O) and sulfur (S), depending on the type of aldoxime ester or aldoxime carbonate.

The following examples are provided based on the assumption that $R^1$ is linked to the carbonyl (or thiocarbonyl) group of the ester (or carbonate) by a carbon atom. If $R^1$ terminates in an oxygen or sulfur atom, however, nomenclature would be adjusted as understood by those of ordinary skill in the art. When X is oxygen and Y is oxygen, the aldoxime ester is an aldoxime ester. When X is sulfur and Y is oxygen, the aldoxime ester is an aldoxime thioic S-ester. When X is oxygen and Y is sulfur, the aldoxime ester is an aldoxime thioic O-ester. When X and Y are both sulfur, the aldoxime ester is an aldoxime thioic ester. The subscript "n" is an integer of one or greater. When n is one, $R^2$ contains a free radically polymerizable group. When n is greater than one, $R^2$ may or may not contain a free radically polymerizable group.

Particularly preferred aldoxime esters and carbonates in the class include those where $R^1$ is independently selected from the following moieties:

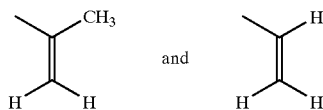

and those where $R^2$ is independently selected from the following moieties:

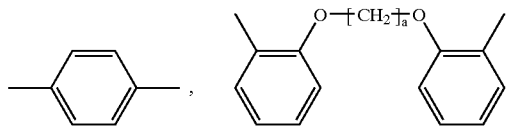

where a is 3, 4, 5, or 6,

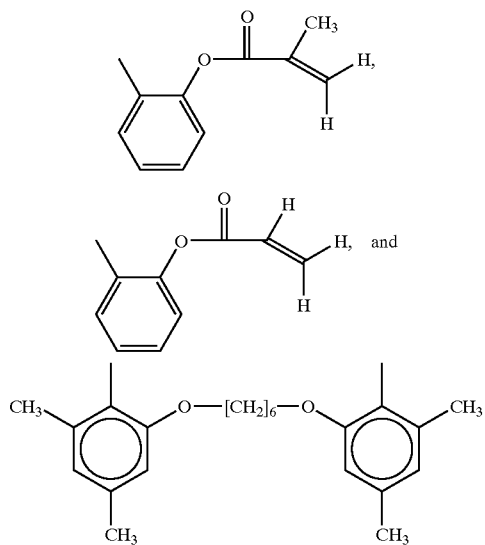

Further preferred embodiments of degradable crosslinkers of the invention are those where n is 2 and $R^1$ is selected from:

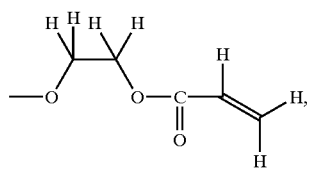

-continued

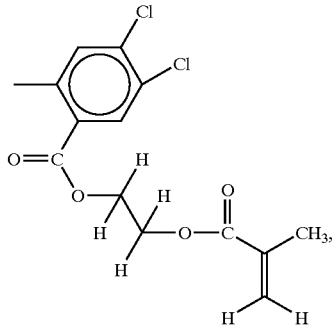

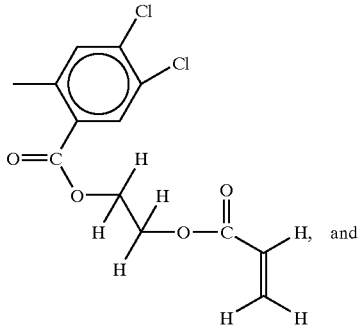

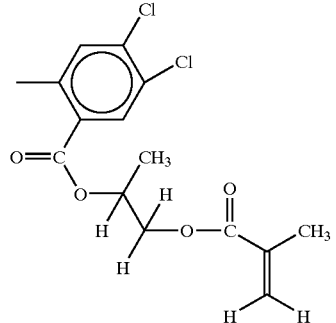

and $R^2$ is:

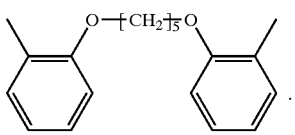

The aldoxime esters and carbonates can be prepared using any suitable method as recognizable to those of ordinary skill in the art. Aldehydes are a general starting material for preparation of the aldoxime esters and carbonates. For example, difunctional (meth)acrylate (i.e., methacrylate or acrylate) aldoxime esters and carbonates can be prepared from diethers of salicylaldehyde. The aldehyde either contains a free radically polymerizable group or is linked to a free radically polymerizable group through a functional group in the aldehyde. During preparation of the aldoxime esters and carbonates, aldehydes are converted to aldoximes with hydroxylamine.

The aldoximes are generally esterified with an acid chloride containing a free radically polymerizable group to make aldoxime esters. Those of ordinary skill in the art will understand that the reactants and/or reaction sequence can be varied to arrive at the same products.

Alternatively, when making aldoxime carbonates, the aldoxime is reacted with a phosgene instead of esterifying the aldoxime. The reaction product is then further reacted with an alcohol to form an aldoxime carbonate. Alternatively, the aldoxime is reacted with a chloroformate instead of esterifying the aldoxime to arrive at an aldoxime carbonate. Again, those of ordinary skill in the art will understand that the reactants and/or reaction sequence can be varied to arrive at the same products.

Subsequent reaction with multifunctional ethylenically unsaturated compounds, such as (meth)acryloyl chlorides, to impart additional free radically polymerizable groups to the aldoxime ester or carbonate, may then be performed, if desired.

Amide Esters

An amide ester, as used herein, is a compound containing at least one amide group and at least one ester group. Amide esters (including, for example, amide esters, amide thioic esters, and amide dithioic esters) generally cyclize to an imide, eliminating an alcohol or thiol and generally conform to the following structure (II):

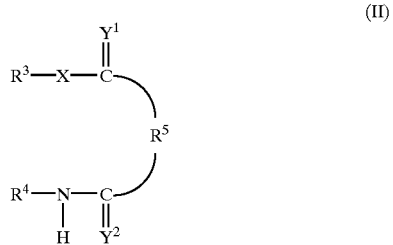

(II)

$R^3$ is a moiety that contains a free radically polymerizable group (e.g., a (meth)acrylate, (meth)acrylamide, styrene, vinyl ester, or fumarate group) and links to the oxygen atom of the ester (if X and $Y^1$ are both oxygen) or thioic O-ester (if X is oxygen and $Y^1$ is sulfur), or links to the sulfur atom of the thioic S-ester (if X is sulfur and $Y^1$ is oxygen) or dithioic ester (if X and $Y^1$ are both sulfur). For example, $R^3$ can comprise an alkenylene, alkenyl, cycloalkenyl, alkylene, aralkylene, aralkenylene, cycloalkylene, cycloalkenylene, or arylene group linked to the oxygen atom of the ester (if X and $Y^1$ are both oxygen), thioic O-ester (if X is oxygen and $Y^1$ is sulfur), thioic S-ester (if X is sulfur and $Y^1$ is oxygen), or dithioic ester (if X and $Y^1$ are both sulfur). The $R^3$ moiety may also be substituted with one or more heteroatoms (e.g., O, S, N, halogens, etc.) or functional groups in the hydrocarbon chain (e.g., oximes, esters, carbonates, amides, ethers, urethanes, ureas, carbonyl groups, or mixtures thereof) that are inert to free radical polymerization.

$R^4$ is a moiety that may or may not contain a free radically polymerizable group (e.g., a (meth)acrylate, (meth)acrylamide, styrene, vinyl ester, or fumarate group). For example, $R^4$ can comprise any hydrocarbon group linked to the nitrogen atom of the amide by a carbon atom. For example, $R^4$ can comprise an alkyl, cycloalkyl, alkylene, thioalkylene, oxyalkylene, alkenylene, alkenyl, cycloalkenyl, aralkylene, aralkenylene, cycloalkylene, cycloalkenylene, aryl, or arylene group linked to the nitrogen atom of the amide. The $R^4$ moiety may also be substituted with one or more heteroatoms (e.g., O, S, N, halogens, etc.) or functional groups (e.g., oximes, esters, carbonates, amides, ethers, urethanes, ureas, carbonyl groups, or mixtures thereof) in the hydrocarbon chain that are inert to free radical polymerization.

$R^5$ is a moiety that links to the amide carbonyl (if $Y^1$ is oxygen) or amide thiocarbonyl (if $Y^2$ is sulfur) with at least one carbon atom and to the ester carbonyl (if $Y^1$ is oxygen) or ester thiocarbonyl (if $Y^2$ is sulfur) with at least one carbon atom. $R^5$ may or may not contain a free radically polymerizable group (e.g., a (meth)acrylate, (meth)acrylamide, styrene, vinyl ester, or fumarate group). However, one, but not both, of $R^4$ or $R^5$ contains a free radically polymerizable group. Examples of $R^5$ include those moieties capable of becoming incorporated into a 5- or 6-membered ring, which ring includes $R^5$ and the imide, upon cyclization of the degradable crosslinker to an imide. As such, typically $R^5$ contains two or three atoms in a chain, with the terminal atoms each being carbon. When there are three atoms in the chain, the center atom may be, for example, carbon or a divalent heteroatom (e.g., oxygen or sulfur). The chain may also contain pendent hydrocarbon groups therefrom, such as when $R^5$ contains a free radically polymerizable group. One or more atoms in the chain may also be part of a ring structure. Preferably, $R^5$ comprises an alkylene or arylene (e.g., ortho arylene) group.

X, $Y^1$, and $Y^2$ are independently selected from oxygen (O) and sulfur (S), depending on the type of amide ester. That is, each Y constituent ($Y^1$ and $Y^2$) occurring within an amide ester may be the same or different from other Y constituents. Similarly, X may be the same as one or both of the Y constituents. Alternatively, X may be different from each of the Y constituents.

When X is oxygen, $Y^1$ is oxygen, and $Y^2$ is oxygen, the amide ester is an amide ester. When X is oxygen, $Y^1$ is oxygen, and $Y^2$ is sulfur, the amide ester is a thioamide ester. When X is oxygen, $Y^1$ is sulfur, and $Y^2$ is oxygen, the amide ester is an amide thioic O-ester. When X is oxygen, $Y^1$ is sulfur, and $Y^2$ is sulfur, the amide ester is a thioamide thioic O-ester.

When X is sulfur, $Y^1$ is sulfur, and $Y^2$ is sulfur, the amide ester is a thioamide dithioic ester. When X is sulfur, $Y^1$ is oxygen, and $Y^2$ is sulfur, the amide ester is a thioamide thioic S-ester. When X is sulfur, $Y^1$ is sulfur, and $Y^2$ is oxygen, the amide ester is an amide dithioic ester. When X is sulfur, $Y^1$ is oxygen, and $Y^2$ is oxygen, the amide ester is an amide thioic S-ester.

Particularly preferred amide esters in the class include those where $R^3$ is:

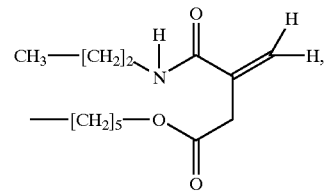

$R^4$ is:

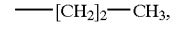

and $R^5$ is:

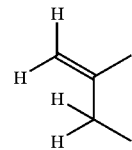

The amide esters can be prepared using any suitable method as recognizable to those of ordinary skill in the art. Anhydrides are a general starting material for preparation of the amide esters. The anhydride is generally combined with a free radically polymerizable alcohol to form an ester acid.

The acid moiety is then converted to a more chemically reactive derivative, such as an acid chloride, that can react with a primary amine, such as an amino alcohol or diamine. Upon reaction with the primary amine, an amide ester is formed. Subsequent reaction with multifunctional ethylenically unsaturated compounds, such as (meth)acryloyl chlorides, to impart additional free radically polymerizable groups to the amide ester may then be performed, if desired. Those of ordinary skill in the art will understand that the reactants and/or reaction sequence can be varied to arrive at the same products.

Materials to be Adhered Together

Materials that can be adhered together using the methods of the invention include, for example, metal, asphalt, concrete, ceramic, wood, masonry, glass, polymeric materials, and painted surfaces. Of particular interest in this invention are materials that are rough or porous. It is well known to those skilled in the art that it is difficult to find adhesives or other surface preparation compositions that adhere well to porous or rough surfaces. This is especially true for pressure-sensitive adhesives that are pressed or laminated to the surface. The difficulty of forming a good bond with rough or porous surfaces is a result of the inability of the adhesive to completely wet out and conform to the surface. The result is that a very small percentage of the available surface area is covered by the adhesive. This results in a weak or poor bond. The use of thermal sprayed powdered surface preparation compositions overcomes this difficulty by propelling small molten drops of surface preparation composition towards the rough surface. When these molten drops of surface preparation composition hit the surface they spread out and more completely wet the surface. The surface preparation composition is thus well anchored to the rough surface and itself provides a relatively flat surface for bonding to another material.

Examples of metal surfaces include aluminum, steel, copper, and brass, but are not limited in scope to only these examples. The metal may be in sheet form such as the surface of a traffic sign, or it may be cylindrical such as in the shape of a pipe or pole, or it may be corrugated such as in a highway guard rail. Other shapes are also within the scope of this invention. The asphalt can be in the form of a roadway, bicycle path, or a pedestrian walkway surface. Concrete surfaces may include concrete blocks, roadways, curbs, sidewalks, parking lots, bridge abutments, and a large number of other concrete surfaces to which adhesion enhancement is desired. Ceramic surfaces include, for example, tile, porcelain, and stone. Wood surfaces include, for example, wood panels, particle board, wooden barricades, wooden walkways, or wooden parts of vehicles. Masonry includes, for example, brick and cinder block. Glass windows are another example of substrates for which this invention is important. Painted surfaces can include, for example, the painted sides of vehicles such as trucks or railway cars, painted markings on a roadway, painted sign surfaces, painted walls, or painted traffic barricades or barriers.

Polymeric materials useful in this invention may be in sheet form or may take any other shape. They may also include a layer of adhesive. In this way, the surface preparation composition acts as a primer for an overlying layer of adhesive. Preferably, a polymeric material is directly applied to a surface having the surface preparation composition thereon. This can be accomplished by a number of methods including spraying, hot melt coating, or laminating. Examples of this polymeric material include, but are not limited to, polyethylenes, polypropylenes, polyesters, polyacrylamides, polycarbonates, poly(vinyl chloride)s, poly(methyl methacrylate)s, polyacrylates and polyimides. The polymeric material may also be biological in origin and may include cellulose and its natural or synthetic derivatives. It is most preferred that the polymeric material be an adhesive or the backside of a polymeric sheeting (e.g., traffic control sheeting device) that does not have an adhesive coated thereon.

Examples of polymeric materials useful in the methods of this invention include polymeric traffic drums or cones, polymeric barricades, polymeric signage, as well as various types of polymeric sheeting. Polymeric sheeting can include reflective or nonreflective traffic control sheetings, pavement marking tapes, and vinyl signing substrates. Examples of traffic control sheeting include High Intensity Sheeting, 3800 series, Barrier Delineation Sheeting, 7500 Series both under the tradename SCOTCHLITE available from 3M Company, St. Paul, Minn. Pavement marking tapes are exemplified by High Performance Tape, 380 series available under the tradename STAMARK also from 3M Co.

Adhesives such as epoxy and bitumen are useful in this invention. Suitable adhesives useful in the present invention may also include pressure-sensitive adhesives. Pressure-sensitive adhesives useful in the present invention include tackified natural rubbers, synthetic rubbers, tackified styrene block copolymers, (meth)acrylics, poly(alpha-olefins), and silicones.

Useful natural rubber pressure-sensitive adhesives generally contain masticated natural rubber, from 25 parts to 300 parts of one or more tackifying resins to 100 parts of natural rubber, and typically from 0.5 part to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins. Other materials can be added to natural rubber adhesives for special purposes, wherein the additions can include plasticizers, pigments, and curing agents to partially vulcanize the pressure-sensitive adhesive.

Another useful class of pressure-sensitive adhesives are those that include synthetic rubber. Such adhesives are generally rubbery elastomers, which are either self-tacky or non-tacky and require tackifiers.

Self-tacky synthetic rubber pressure-sensitive adhesives include for example, butyl rubber, a copolymer of isobutylene with less than 3 percent isoprene, polyisobutylene, a homopolymer of isoprene, polybutadiene, or styrene/butadiene rubber.

Synthetic rubber pressure-sensitive adhesives, which generally require tackifiers, are also generally easier to melt process. They include polybutadiene or styrene/butadiene rubber, from 10 parts to 200 parts of a tackifier, and generally from 0.5 part to 2.0 parts per 100 parts rubber of an antioxidant. An example of a synthetic rubber is that available from B F Goodrich under the trade name AMERIPOL 101 IA, a styrenelbutadiene rubber. Tackifiers that are useful include derivatives of rosins, polyterpenes, C5 aliphatic olefin-derived resins, and C9 aromatic/aliphatic olefin-derived resins.

Styrene block copolymer pressure-sensitive adhesives generally include elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure-sensitive adhesives include linear, radial, star and tapered styrene-isoprene block copolymers such as those available under the trade names KRATON D 1107P, KRATON G1657, KRATON G 1750X, and KRATON D 1118X from Shell Chemical Co. The polystyrene blocks tend to form domains in the shape of spheroids, cylinders, or plates that causes the block copolymer pressure-sensitive adhesives to have two phase structures. Resins that associate with the rubber phase generally develop tack in the pressure-sensitive adhesive. Examples of rubber phase associating resins include aliphatic olefin-derived resins, such as those available under the trade names ESCOREZ 1300 and WINGTACK from Goodyear; rosin esters, such as those available under the trade names FORAL and STAYBELITE Ester 10 from Hercules, Inc.; hydrogenated hydrocarbons, such as those available under the trade name ESCOREZ 5000 from Exxon; polyterpenes, such as those available under the trade name PICCOLYTE A; and terpene phenolic resins derived from petroleum or terpentine sources, such as those available under the trade name PICCOFYN A100 from Hercules, Inc. Resins that associate with the thermoplastic phase tend to stiffen the pressure-sensitive adhesive.

(Meth)acrylic pressure-sensitive adhesives generally have a glass transition temperature of about −20° C. or less and may include from 100 to 80 weight percent of a C4–C12 alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene, vinyl acetate, N-vinyl pyrrolidone and styrene macromer. Preferably, the (meth)acrylic pressure-sensitive adhesives include from 0 to 20 weight percent of acrylic acid and from 100 to 80 weight percent of isooctyl acrylate. The (meth) acrylic pressure-sensitive adhesives may be self-tacky or tackified. Useful tackifiers for (meth)acrylics are rosin esters such as that available under the trade name FORAL 85 from Hercules, Inc., aromatic resins such as that available under the trade name PICCOTEX LC-55WK from Hercules, Inc., aliphatic resins such as that available under the trade name PICCOTAC 95 from Hercules, Inc., and terpene resins such as that available under the trade names PICCOLYTE A-115 and ZONAREZ B-100 from Arizona Chemical Co. Other materials can be added for special purposes, including hydrogenated butyl rubber, pigments, and curing agents to vulcanize the adhesive partially.

Poly(alpha-olefin) pressure-sensitive adhesives, also called a poly(1-alkene) pressure-sensitive adhesives, generally include either a substantially uncrosslinked polymer or an uncrosslinked polymer that may have radiation activatable functional groups grafted thereon as described in U.S. Pat. No. 5,209,971 (Babu,et al.). The poly(alpha-olefin) polymer may be self tacky and/or include one or more tackifying materials.

Tackifying materials are typically resins that are miscible in the poly (alpha-olefin) polymer. The total amount of tackifying resin in the poly(alpha-olefin) polymer ranges from 0 to 150 parts by weight per 100 parts of the poly (alpha-olefin) polymer depending on the specific application. Useful tackifying resins include resins derived by polymerization of C5 to C9 unsaturated hydrocarbon monomers, polyterpenes, synthetic polyterpenes and the like. Examples of such commercially available resins based on a C5 olefin fraction of this type include those available under the trade name WINGTACK from Goodyear Tire and Rubber Co. Other materials can be added for special purposes, including antioxidants, fillers, pigments, and radiation activated crosslinking agents.

Silicone pressure-sensitive adhesives include two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer including polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone pressure-sensitive adhesives is described in U.S. Pat. No. 2,736,721 (Dexter). Manufacture of silicone urea block copolymer pressure-sensitive adhesive is described in U.S. Pat. No. 5,214,119 (Leir et al.).

Other materials can be added to the adhesive for special purposes, including, pigments, plasticizers, and fillers. Fillers are typically used in amounts from 0 part to 10 parts per 100 parts of silicone pressure-sensitive adhesive. Examples of fillers that can be used include zinc oxide, silica, carbon black, pigments, metal powders, and calcium carbonate.

Alternatively the adhesive layer may be part of an article. The articles of this invention can include but are not limited to reflective traffic control sheetings and pavement marking tapes. Articles containing adhesives which exemplify materials suitable for use in methods of the invention are High Intensity Sheeting, 3800 series available under the tradename SCOTCHLITE and High Performance Tape, 380 series available under the tradename STAMARK, both from 3M Co. Raised pavement markings such as those available under the tradename Marker Series 290 available from 3M Co. are also within the scope of materials useful in methods of this invention It is well within the scope of this invention to include a third material that can be applied to the powdered surface preparation composition after the powdered surface preparation composition has been applied to a first material and a second material contacted with and bonded to the first material. For instance, where the first material is a roadway and the second material is an adhesive or a hot thermoplastic material that is inherently tacky, it is within the scope of this invention to add beads, pigment particles, or skid particles to the second material. Beads and pigment particles useful in this invention are described in U.S. Pat. No. 3,664,242 (Harrington et al) and skid particles are described in U.S. Pat. No. 5,094,902 (Haenggi et al). These third materials may also contact the powdered surface preparation composition.

Another embodiment of this invention comprises thermal spraying a powdered surface preparation composition onto at least one surface of a first material, wherein the first material comprises a scrim on a substrate. The scrim is an open material having a relatively large number of discrete open areas or pores, which pass through the scrim from one face to the opposite face. Suitable scrims include a wide variety of reinforcement scrims, which can be woven or nonwoven. The scrim material can be formed of any suitable material such as an organic polymer, fiberglass, ductile metal, or the like. Suitable organic polymeric materials include polyethylene, polyethylene terephthalate (polyester), ethylene vinyl acetate, polypropylene, nylon, and combinations thereof (including blends and copolymers). Also, coextruded structures and coated netting could be useful. Preferably, the scrim is formed of thermoplastic fibers material such as the cross-laminated polyethylene slit-film fibers sold under the trade name CLAF by ANCI (Amoco Nisseki CLAF, Inc).

Other cross-laminated fibrous scrims could also be used, with the lamination done by conventional techniques such as heat, thermomechanical or adhesive coating of the fibrous cross-laminated structure. Other processes useful to form suitable scrims include extruded netting, extruded/oriented netting, perforated films, expanded films, and perforated nonwovens.

Preferably, the scrim has discrete open areas with an average cross-sectional area of at least about 0.5 $mm^2$, and more preferably at least about 1.0 $mm^2$. The scrim open area can also be described in terms of an Effective Circular Diameter (ECD) which is the diameter of the largest circle that can fit into an individual discrete open area. The average ECD is generally at least about 300 microns, preferably at least about 500 microns.

Preferably, the open areas have a non-tortuous path through the scrim, and more preferably the open areas extend directly from one face to the opposite face (e.g., as a column). If desired, the scrim can be treated with corona discharge or other surface treatments or primers to enhance adhesion of the adhesive to the scrim.

The scrim provides body and shape for the surface preparation composition as well as shear resistance within the composition. When used in this way the second material can be directly applied to the scrim/powdered surface preparation composition without the need for an additional adhesive. Or the second material may contain an additional adhesive and may contact the scrim/powdered surface preparation composition after application.

All of these examples are illustrative of materials useful in this invention but they are not meant to limit the scope of the invention.

EXAMPLES

Objects and advantages of this invention are further illustrated by the following examples, but the particular materials and amounts thereof recited in these examples, as well as other conditions and details, should not be construed to unduly limit this invention.

Portable Adhesive Peel Tester

Figure 2:
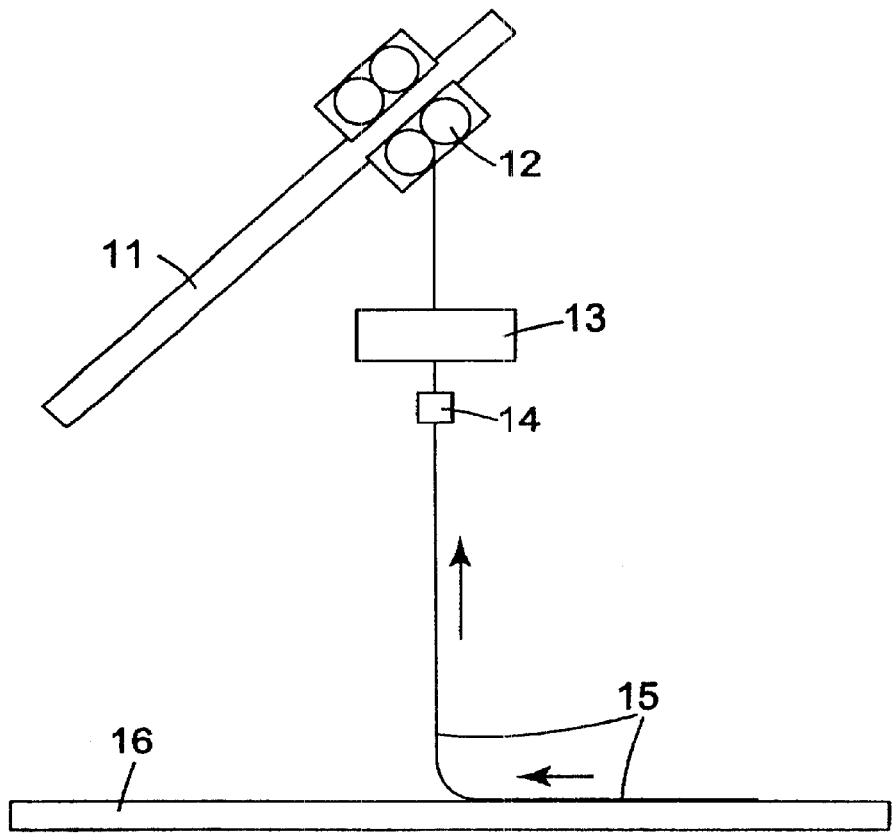
FIG. 2 is a schematic of a portable adhesive peel tester used to test the peel strength of tapes adhered to asphalt, concrete blocks, and roadways.

The Portable Adhesive Peel Tester (PAPT) used for the analysis of the surface preparation compositions of the examples is a portable device which performs typical adhesive peel and tensile tests and specifically is designed to accurately measure peel strength of pavement marking tapes bonded to actual road or highway surfaces. A diagram of this device is shown in FIG. 2. The device consists of:

1) A motorized sample puller consisting of a folding frame (not shown), a moveable carriage 12 on a pair of inclined rails 11, a load cell 13 for measuring peel force and a sample clamp 14. The carriage is driven at a specified constant speed along a pair of rails inclined at 45 degrees to the sample surface. The movement up the 45 degree incline results in equal travel in both the horizontal and vertical directions. The sample 15 which has previously been applied to a substrate 16 is pulled off of that substrate at a 90 degree angle and the peel force for removing that sample is measured.

2) A power and speed control module consisting of rechargeable batteries (to supply power to the drive motor and load cell), a motor speed control, a signal amplifier (to process load cell signals for the chart recorder), and a battery charger.

3) A chart recorder, which is a standard battery-operated variable speed roll fed paper recorder.

Flame-spray Application Equipment

Figure 3:
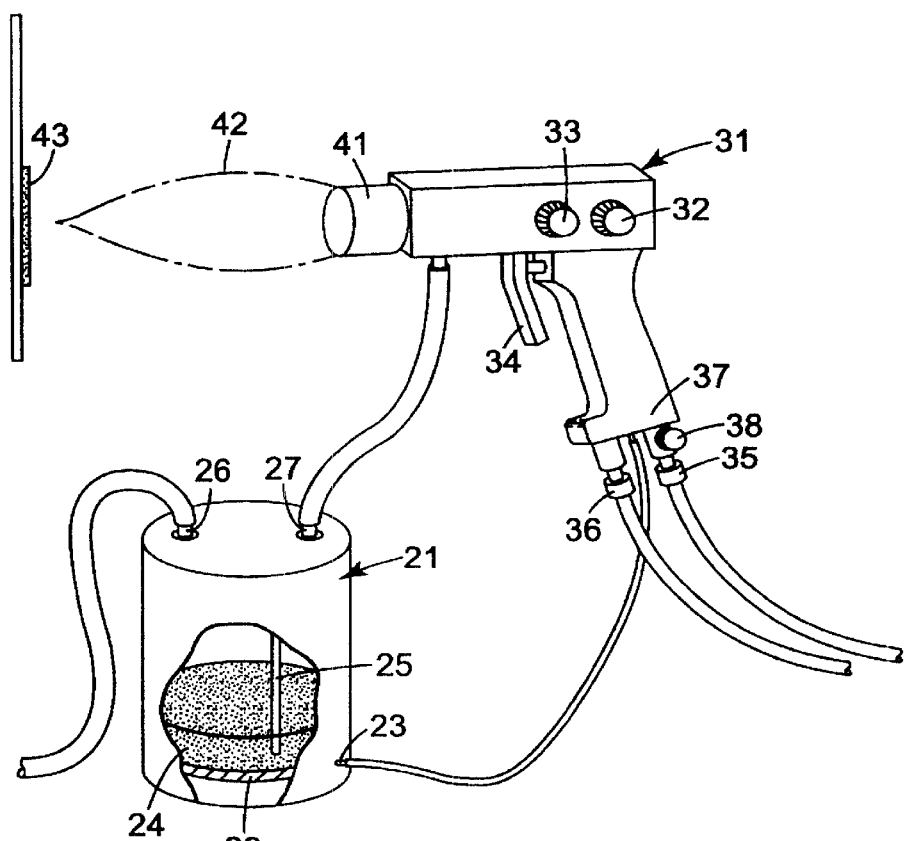
FIG. 3 is a schematic of a laboratory flame spray dry powder applicator that includes a fluidized bed and a spray gun.

The flame-spray equipment used for the laboratory examples was a hand-held air/propane flame-spray system consisting of a Model HR-1-4 fluidized bed hopper, available from Nordson, Amherst, Ohio attached to a Model 124 flame-spray gun, commercially available from Plastic Flamecoat Systems, Big Spring, Tex. under the tradename POWDER PISTOL. The powder was placed in the fluidized bed hopper and the following conditions were used for the application of the surface preparation composition. FIG. 3 is a diagram of the setup used for the experimental examples. It consists of a fluidized bed canister 21 and a hand-held flame spray gun 31. The fluidized bed canister 21 includes within it a porous air screen 22 which holds the powder above a lower section within the canister. This lower section has an air inlet 23 situated so as to provide air to the canister and to fluidize the powder 24 above the screen as the air passes through the screen. A vent 26 is provided at the top of the canister to keep pressure from building up within the canister. A powder outflow tube 25 is placed below the surface of the fluidized powder and exits the canister through powder outlet 27. The flame spray gun 31 has attached to it two gas inlets 35 and 36. Gas inlet 35 is for a combustible gas such as propane or natural gas and is regulated by valve 38. Gas inlet 36 is for air which aids in the combustion of the combustible gas and also provides a source of air through outlet 37 from the gun to inlet 23 of the fluidized bed. Outlet 37 is connected to inlet 23 with a hose. The air and combustible gas are mixed within the gun. This mixture is controlled by valve 32. The mixture flows through nozzle 41 and, when ignited, produces a flame 42. Air is also directed through control valve 33 and trigger 34 over the inlet 39 of the flow of fluidized powder and air from the outlet of the fluidized bed 27. When the trigger is depressed air flows over inlet 39 causing powder to be sucked into the stream of combustible gas and air and subsequently through the flame 42. The stream of flame sprayed powder is deposited on the substrate 43.

| | |
|---|---|
| Flame air: | 20 liters/minute |
| Propane: | 2 liters/minute |
| Powder Transport Air: | 42 liters/minute |
| Powder Output: | 100 grams/minute |
| Gun Traverse Speed | approximately 10 meters/minute |

Substrates

Concrete blocks were made to Minnesota Department of Transportation Specifications by Harddrives of St. Cloud Minn. The blocks were molded in aluminum pans approximately 21.6 cm×30.5 cm. The surface to be tested was roughened by sweeping with a broom prior to the setting of the concrete. The blocks were used as is—they were not prepared prior to application of the powder layer.

Asphalt blocks were cut from pavement deposited on plywood sheets. The formula used was the same formula used for building asphalt roads in St. Paul, Minn. The surface of the asphalt was of the roughness normally obtained after steam rolled hot asphalt is allowed to cool on the roadway.

Comparative Example 1A

The flame-spray equipment described above was used without any powder in the fluidized bed hopper. The flame was adjusted to the conditions described above. The broom-swept side of a concrete block (see substrate section) was preheated with a sweep of the flame (distance between the concrete surface and the flame gun was approximately 4–6 inches). The temperature of the surface was measured with an infrared detecting thermometer as approximately 50° C. Immediately a 2.54 centimeter (cm) wide by 25.4 cm long strip of 380SD pavement marking tape, available from 3M Co., St. Paul, Minn. under the tradename STAMARK was applied to the concrete. The tape was pressed with a rubber roller using approximately 0.7 N of force by hand for approximately 30 seconds. The sample was allowed to stand for a minimum of 24 hours at room temperature before being evaluated for peel strength. Peel strength was measured using the Portable Adhesive Peel Tester (PAPT) described above at a sample peel rate of 22.86 centimeters per minute (cm/min). The data was recorded on a strip chart recorder. The value reported in the Table was the average value of all of the high and low points recorded on the strip chart recorder during the peel test.

Comparative Example 1B

The procedure used for Comparative Example 1A was used except that the substrate was an asphalt block as described in the substrate section above.

Comparative Examples 2A and 2B

A sample of a concrete block (2A) and an asphalt block (2B) were coated with Adhesive P55, available from 3M Co., St. Paul, Minn. under the tradename STAMARK using a paint brush. The adhesive was allowed to air dry for at least 15 minutes to allow for the solvent to evaporate. Then a sample of 380SD pavement marking tape available from 3M Co., St. Paul, Minn. under the tradename STAMARK, was applied to the adhesive-coated block according to the conditions in Comparative Example 1A. The reported data was collected and analyzed according to the procedure used in Comparative Example 1A.

Comparative Examples 3A and 3B

The same procedure was used as described in Comparative Examples 2A and 2B except that Adhesive SP44 was used instead of Adhesive P55 which are both available from 3M Co., St. Paul, Minn. under the tradename STAMARK.

Examples 4A and 4B

The procedure of Example 1A was used with the following changes. The fluidized bed hopper was filled with a precrosslinked powder of structure 85/5/10 Isooctyl acrylate/Methyl methacrylate/Acrylic acid using as a crosslinker 0.5% by weight of 2-(5-[2-(hydroxyiminomethyl)phenoxy]pentyloxy) benzaldehyde oxime dimethacrylate ester. The synthesis of the powder and crosslinker are described in Applicants' Assignees' copending applications Ser. No. 09/612,016 filed on even date herewith. The surface of the substrate was pretreated with a flame as in Example 1A. Then a second pass of the flame sprayer was made with the powder spray to coat a thin layer of surface preparation composition on the substrate. While still warm, the 380SD a sheeting strip available from 3M Co., St. Paul, Minn., under the tradename STAMARK was applied and rolled down. After a minimum of 24 hours the peel force for removing the test strip was measured and recorded as before.

Example 5A and 5B

The same procedure was followed as in Examples 4A and 4B except that PFS HIGH FLOW Polyarmour High Flow Polyolefin Powder Coating (available from Plastic Flamecoat Systems, Big Spring, Tex.) was used as the powder.

Examples 6A and 6B

The same procedure was followed as in Examples 4A and 4B except that PFS S1CLFEMAA powder coating (available from Plastic Flamecoat Systems, Big Spring, Tex.) was used as the powder.

Examples 7A and 7B

The same procedure was followed as in Examples 4A and 4B except that L6030 IP epoxy powder coating, available from 3M Co., St. Paul, Minn. under the tradename SCOTCHCOAT was used as the powder.

Examples 8A and 8B

The same procedure was followed as in Examples 4A and 4B except that 25587C Spray Powder Nylon Resin 7, available from F. J. Brodmann and Co., Harvey, La. under the tradename FLOMASTER was used as the powder.

Examples 9A and 9B

The same procedure was followed as in Examples 4A and 4B except that Powder GL 2110 available from 3M Co., St. Paul, Minn. under the tradename GREEN LITE was used as the powder.

Examples 10A and 10B

The same procedure was followed as in Examples 4A and 4B except that V3M64 (a powder mixture of 70 parts AB 1060N EMAA/zinc ionomer, available from Du Pont, Wilmington, Del., under the tradename ABCITE; 30 parts 5990I EAA Copolymer, available from The Dow Chemical Company, Midland, available under the tradename PRIMACOR; 1 part each of stabilizers 328, 994LD and 1010 all available from Ciba Specialty Chemicals, Tarrytown, N.Y. under the tradenames TINUVIN, CHIMASORB and IRGANOX respectively) was used as the powder.

Examples 11A and 11B

The same procedure was followed as in Examples 12A and 12B except that B66/VYHH 75/25 (a mixture of 75 parts Rohm and Haas B66 acrylic copolymer, available from Rohm and Haas Company, Philadelphia, Pa. under the tradename ACRYLOID and 25 parts Union Carbide VYHH vinyl copolymer, available from Union Carbide. Corporation, Danbury, Conn.) was used as the powder.

Example 12

Measurement of Tape 90 Degree Peel Strength from Primed Substrates

Figure 4:
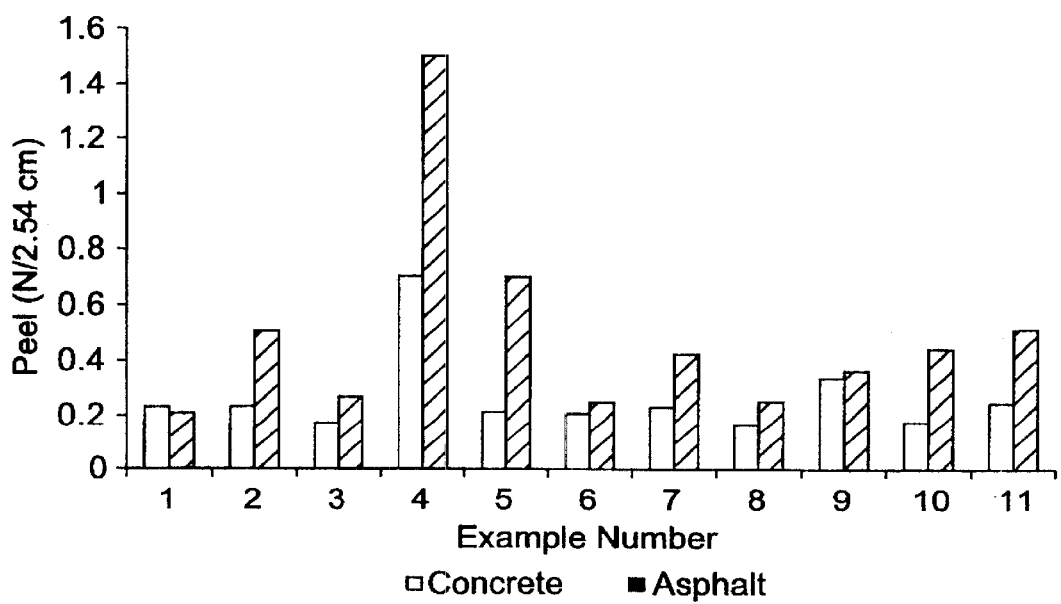
FIG. 4 displays the 90 degree peel value in Newtons/2.54 cm of STAMARK 380 pavement markings, available from 3M Company, St. Paul, Minn. The markings were applied over a concrete or asphalt block road sample which had been flame treated with a surface preparation composition according to the present invention. The measurements were made using a portable adhesive peel tester.

The samples from Examples 1A–11B were stored at room temperature and 50% relative humidity for a period of 24 hours before testing. The sample was then placed horizontally on a flat surface. The PAPT apparatus described above was positioned directly over the sample. One end of the sample was peeled from the substrate and placed in the sample clamp of the testing apparatus. The sample was then peeled at a 90 degree angle at a linear rate of 22.86 cm/min and the peel force was reported in Newtons per inch (N/in) (2.54 cm wide strips were used in all cases). The results are tabulated in Table I and are shown graphically in FIG. 4.

TABLE I 90 degree Peel of 380SD Tape from Asphalt or Concrete Blocks with Surface preparation composition (N/2.54 cm) at 22.86 cm/min peel rate

| Example | Peel to Concrete | Example | Peel to Asphalt |
|---|---|---|---|
| Comparative Example 1A | .230 | Comparative Example 1B | .209 |
| Comparative Example 2A | .230 | Comparative Example 2B | .503 |
| Comparative Example 3A | .173 | Comparative Example 3B | .265 |
| 4A | .698 | 4B | 1.50 |
| 5A | .213 | 5B | .694 |
| 6A | .207 | 6B | .245 |
| 7A | .229 | 7B | .421 |
| 8A | .166 | 8B | .249 |
| 9A | .334 | 9B | .360 |
| 10A | .175 | 10B | .439 |
| 11A | .242 | 11B | .507 |

Example 13

Application of Pavement Marking Tape to Existing Asphalt Surface Using a Surface Preparation Composition

A 10.2 cm wide and 4.57 meter (m) long yellow stripe of 381 pavement marking tape available from 3M, St. Paul Co., Minn. under the tradename STAMARK was installed on existing asphalt pavement as follows:

A gasoline powered air blower was used to blow away excess rocks, sand, and dirt from the intended application site. Then the section to be striped was heated by passing the flame from a Striper Model GLG-20, available from 3M, St. Paul, Minn. under the tradename GREEN LITE, over this section. The hopper of the striper was then filled with the same adhesive from Examples 4A and 4B. The surface preparation composition was then applied to the road surface using one slow pass of the striper over the section to be marked. Immediately after the application of the surface preparation composition a 4.57 m×10.2 cm wide strip 381 pavement marking tape (containing adhesive) was applied over the adhesive by band. Then a 68 kg roller was passed over the striping material with four passes. The pavement marking line was observed to be well adhered to the surface.

Example 14

Application of Pavement Marking Tape Containing no Adhesive to Existing Asphalt Surface

The procedure of Example 13 was used with the following changes. The tape to be applied was a 30.5 cm×4.57 m long×0.61 millimeter (mm) thick of a pavement-marking composition identical to that disclosed in Example 3 of Table II of U.S. Pat. No. 4,490,432 incorporated herein by reference. This tape contains no adhesive. The Striper Model GLC-20 (available from 3M Co., St. Paul, Minn. under the tradename GREEN LITE) was used to apply a thick layer of surface preparation composition to the prepared asphalt surface by using 6 passes. The thickness of the applied adhesive was estimated to be around 0.5–1.0 mm thick. The tape was applied directly over the thick adhesive layer while still warm. After rolling as described above, the tape was found to be tightly adhered to the asphalt pavement.

Comparative Example 15

The procedure of Examples 4A and 4B was used to provide a thin coating of GL2110 White Powder, available from 3M Co., St. Paul, Minn. under the tradename GREEN LITE, on a 51 micron thick, polyimide polymer sheet available from Dupont, Wilmington, Del. under the tradename KAPTON. After cooling, the powdered adhesive preparation coating was found to "flake off" of the polyimide substrate upon bending and folding of the polymer.

Example 16

The procedure of Example 15 was used to deposit a thin coating of a mixture of 75% GL2110 White Powder, available from 3M Co. under the tradename GREEN LITE, and 25% of the surface preparation composition from Example 4A adhesive onto polyimide. After cooling, the coating was found to be more resistant to "flake off" than that of Example 15 but will eventually come off of the polyimide surface upon persistent bending and folding of the polymer substrate.

Example 17

The procedure of Example 16 was used to deposit a thin coating of a mixture of 50% GL2110 White Powder and 50% surface preparation compound onto polyimide. After cooling the coating was found to be very resistant to "flake off." It was extremely difficult to cause the coating to lose adhesion to the polyimide substrate.

Example 18

The procedure of Examples 4A and 4B was used to deposit a thin layer of surface preparation composition onto a polyimide substrate. After cooling, the same procedure was used to overcoat a layer of GL2110 White Powder onto the adhesive-coated substrate. After cooling, the coating was found to be very resistant to "flake off" as found in Example 17.

Example 19

The procedure of Examples 4A and 4B was used to deposit a thin layer of flame sprayed adhesive onto a polyimide substrate. After cooling a layer of blue 3732 Fast Drying Spray Enamel, available from Sherwin-Williams Company under the tradename DUTCH BOY, was applied over the surface preparation composition from Example 4A. The paint was observed to be well adhered to the polyimide substrate.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of enhancing adhesion between at least two surfaces, the method comprising:
   thermal spraying a reactive powdered surface preparation composition onto at least a portion of a first surface wherein the powdered surface preparation composition comprises a crosslinked adhesive that is at least partially decrosslinked during thermal spraying and the crosslinked adhesive prior to crosslinking comprises:

at least one polymer; and at least one degradable crosslinker incorporated into the polymer, wherein the degradable crosslinker comprises:

at least one energetically labile moiety; and at least two free radically polymerizable groups, wherein the degradable crosslinker is capable of fragmentation into at least two fragments upon activation by an external energy source and wherein at least two fragments are essentially free of free radicals and ethylenic unsaturations; and subsequently contacting at least a portion of a second surface of a nonpowdered material with a portion of the first surface having the powdered surface preparation composition thereon.

2. The method of claim 1 wherein the first surface comprises a material selected from the group of metal, asphalt, concrete, ceramic, wood, masonry, glass, polymeric materials, and combinations thereof.

3. The method of claim 1 wherein the first surface comprises a painted surface.

4. The method of claim 1 wherein the nonpowdered material is a polymeric sheeting.

5. The method of claim 4 wherein the polymeric sheeting comprises a pavement marking, a sign sheeting, or a barrier delineation sheeting.

6. The method of claim 1 wherein the nonpowdered material is an adhesive.

7. The method of claim 1 wherein the powdered surface preparation composition comprises a powdered thermoplastic or thermoset polymer.

8. The method of claim 1 wherein thermal spraying comprises flame spraying.

9. The method of claim 1 wherein at least one surface comprises a scrim.

10. The method of claim 1 wherein the surface of the polymeric sheeting does not have an adhesive coated thereon.

11. The method of claim 1 wherein the first surface is heated prior to thermal spraying the powdered surface preparation composition thereon.

12. The method of claim 9 wherein at least one surface is heated prior to thermal spraying the powdered surface preparation composition thereon.

* * * * *

UNITED STATES PATENT AND TRADEMARK OFFICE
CERTIFICATE OF CORRECTION

PATENT NO. : 6,475,316 B1
DATED : November 5, 2002
INVENTOR(S) : Kirk, Seth M.

It is certified that error appears in the above-identified patent and that said Letters Patent is hereby corrected as shown below:

Title page,
Item [56], U.S. PATENT DOCUMENTS, insert -- 4634739  1/1987 --.
Insert -- 3616160  10/71 --.
Insert -- 2940133  6/60 --.
Insert -- 2953187  9/60 --.
Insert -- 3736211  9/71 --.
Insert -- 4640810  2/87 --.
Insert -- 5229052  7/93 --.

Column 3,
Line 54, delete ":" following "unmelted".
Line 66, delete "," following "structure".

Column 4,
Line 20, delete "," following "other".

Column 5,
Line 12, delete "," following "Systems".
Line 23, delete "Theological" and insert in place thereof -- rheological --.
Line 49, delete ";" following "polymers".

Column 6,
Line 9, delete "Wilmnington" and insert in place thereof -- Wilmington --.
Line 46, delete "are" following "Assignees".

Column 10,
Line 23, delete "ftmarate" and insert in place thereof -- fumarate --.
Line 30, delete "sulfuir" and insert in place thereof -- sulfur --.

Column 15,
Line 27, delete ":" following "sprayed".

Column 16,
Line 59, delete "$\ell$" and insert in place thereof -- / --.

UNITED STATES PATENT AND TRADEMARK OFFICE
CERTIFICATE OF CORRECTION

PATENT NO.    : 6,475,316 B1
DATED         : November 5, 2002
INVENTOR(S)   : Kirk, Seth M.

It is certified that error appears in the above-identified patent and that said Letters Patent is hereby corrected as shown below:

<u>Column 22,</u>
Line 49, delete "." following "Carbide".

<u>Column 23,</u>
Line 43, delete "band" and insert in place thereof -- hand --.

Signed and Sealed this

Nineteenth Day of August, 2003

JAMES E. ROGAN
*Director of the United States Patent and Trademark Office*